April 9, 1929.   C. E. FOSTER   1,708,294
ELECTRICAL MEASURING INSTRUMENT
Filed April 27, 1925
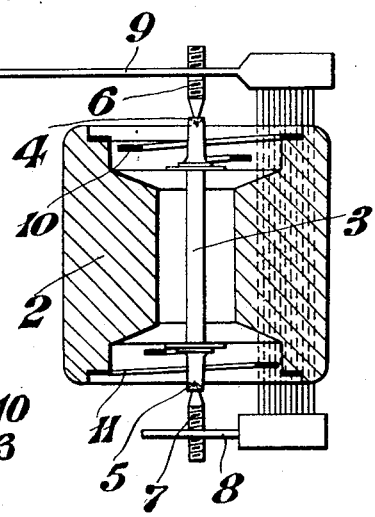
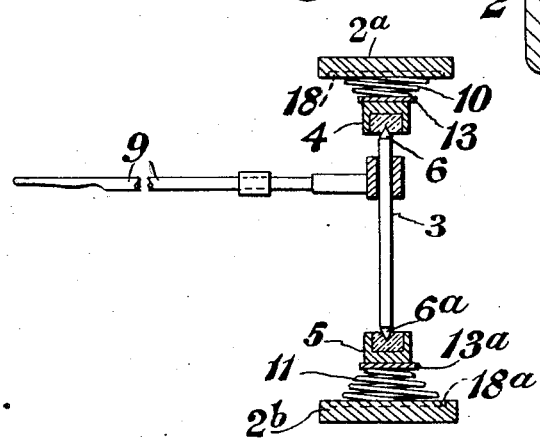
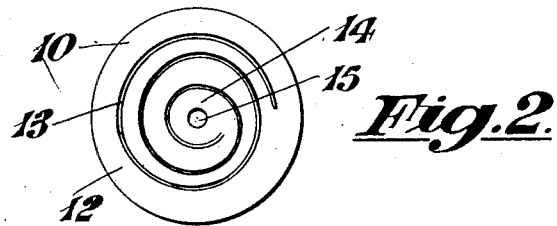
Inventor
Charles Edwin Foster
By Liverance & Van Antwerp.
Attorneys Patented Apr. 9, 1929.

1,708,294

UNITED STATES PATENT OFFICE.

CHARLES EDWIN FOSTER, OF LETCHWORTH, ENGLAND.

ELECTRICAL MEASURING INSTRUMENT.

Application filed April 27, 1925, Serial No. 25,974, and in Great Britain February 9, 1925.

This invention relates to electrical measuring instruments and the like, and has for its object to maintain or improve the efficiency of the instruments and to provide improvements facilitating manufacture of the bearing supporting springs by avoiding the coiling processes as used heretofore in their manufacture.

In instruments in which the moving system is supported upon pointed pivots working in conical jewels it has always been a difficult problem to construct a pivot and jewel, which would, at the same time, give accurate centering of the moving system, freedom from friction errors and ability to withstand some amount of wear or rough usage. It must be borne in mind that the axis of such a moving system may be vertical, horizontal or in some intermediate posture.

The difficulties referred to above are larger in the case of the usual kind of electrical instrument, because the moving forces available to overcome friction are relatively small, and such difficulties reach their extreme limit in electrical instruments of the moving-coil permanent-magnet type of high sensitivity such as used for electrical laboratory measurements, including pyrometry.

The obvious expedient of supporting the jewel in some resilient manner has been known, tried and used for a long time in the art. Various devices for providing this resilient support have been adopted the simplest being a flat spring. Regarding one pivot and jewel separately for the moment, a flat spring can be made to achieve the desired cushioning effect to shield the pivot point from damage due to vibration when considering an axial movement but the possibility of damage is in some cases even greater when the direction of the vibration or acceleration is transverse to the axis of the moving system, and in such a case the flat spring mentioned above does not yield at all. Another construction which has been adopted was to mount the jewel on spring supported plungers sliding in a tube. This, again, did not provide resiliency against transverse vibration and further, introduced a friction effect between the jewel and the tube which reduced the effective resiliency of the jewel mounting even with axial movements under quick vibrations.

The present invention comprises an improvement in the pointer bearing mechanism of such instruments, consisting in the provision therein of a pivot bearing supporting spring of flat sheet metal cut to the form of a spiral or involute of finished shape and size from sheet metal.

The spring may be so cut or punched from sheet metal as to form at one operation a disc having a spiral or involute slit or slot wholly within the disc, and having a continuous rim or ring at its outer edge.

Examples of the invention are illustrated by the accompanying drawings, wherein Fig. 1 is a sectional view of the invention as applied to the core piece of the instrument described in specification of Patent No. 1,375,837. Fig. 2 is a plan of the spring removed. Fig. 3 is a vertical section showing the invention applied to a different form of structure than that shown in Fig. 1.

In these drawings 2 is the fixed core of the moving coil instrument, 3 the spindle supporting the bearings 4 and 5 of the pivots 6 and 7 of the coil and pointer supports 8 and 9. The bearings 4 and 5 on the spindle 3 are supported between springs 10 and 11 fitting in recesses in the upper and lower ends of the core piece 2. Each of the springs 10 and 11 is a flat metal disc having a continuous outer rim or ring portion 12 and an involute or spiral slot 13 extending from the inside of the rim 12 to a point outside the central portion 14, which is provided with a hole 15 whereby it can be mounted on the bearings near the ends of the spindle 3. The invention is also applicable to electrical measuring instrument pointer mountings of the kind in which the relative positions of the pivots and their bearings are reversed, that is the pivots extend outwards from the coil and pointer carrier into jewel or other bearings supported by the central portion of the disc spring, the outer rim of the spring being supported in sockets or recesses on the apparatus. For example in Fig. 3 a structure of this type is shown. A spindle 3 carries the pointer 9 and has pivots 6 and $6^a$ at its ends fitting in conical jewels 4 and 5, which are carried by bridge pieces 13 and $13^a$. The bridge pieces are rigidly joined together by spacers not shown. This structure is borne upon and between the springs 10 and 11, which are of the same structure and form as the springs 10 and 11 shown in Fig 1, and at their opposite ends are seated in recesses 18 and $18^a$ in upper and lower plates $2^a$ and $2^b$.

The spring may be cut directly from a sheet of metal by means of a copying machine of the kind in which a small milling cutter is caused to travel in a path of the exact size and shape required by means of reducing mechanism following a copy of larger size than the finished spring.

In the spiral spring forming the subject of this application, the desired axial resiliency is secured without any sliding friction and, by suitable proportioning of the thickness of the sheet metal from which it is made, and the radial pitch of the spiral slot, any desired degree of resiliency in a direction transverse to the axis may be achieved.

Examination of the spring itself will probably make it evident that using material and dimensions as in this spring the making of press tools for stamping it out would be nearly a mechanical impossibility owing to the extreme difficulty of getting an accurate fit between the punch and the die while, at the same time, avoiding distortion of the metal in the process of punching.

The use of springs of the type described in the combination set forth permits a flexible support of the pivot bearings with a desired degree of flexibility in the direction of the length of the axis about which said pivots turn, while the flexibility transverse thereto is very different. The usual helical coiled spring has substantially the same degree of flexibility in both directions and it is very desirable in delicate instruments of this character to have the degree of flexibility transverse to the pivot axis materially reduced, and with the construction which I have devised this desired effect is attained.

My actual method of manufacture is to mill out this slot as described above.

What I claim and desire to secure by Letters Patent is:—

1. An electrical measuring instrument comprising a hollow supporting core piece, a pointer member mounted for rotation between the poles of said magnet, a spindle to support the pointer member, pivot bearings on said pointer member engaging the extremities of the spindle, a supporting spring of sheet metal connected adjacent each end of the spindle, at one end to the spindle and to the magnet at its opposite end, each of said springs comprising a substantially continuous circular ring of sheet metal attached to the magnet and an integral spiral or involute attached to the spindle, the attachment of the springs to the spindle being in planes located inwardly in the magnet from the planes of said rings attached to the magnet.

2. An electrical measuring instrument comprising a hollow supporting core piece, a spindle extending through the magnet, a spring of flat sheet metal cut to the form of a spiral or involute attached to the spindle adjacent each end and thence extending outwardly toward each end of the spindle and progressively increasing in diameter and having attachment to the magnet at the outer end thereof, and pointer supports pivotally mounted at the ends of the spindle.

3. A spring-supported pointer bearing for electrical measuring instruments, comprising a pointer having oppositely disposed pivots, two pivot bearings, two flexible spiral springs of flat cross section, the pivot bearings being supported in the support by the two springs arranged with their flat cross-section transversely to the axis of the pointer.

4. A pointer bearing for electro-magnetic measuring instruments in which the pointer carries a coil, comprising an angularly movable pointer mounting having its axis in the magnetic field of the instrument, two oppositely disposed pivot bearings, two flexible spiral springs of flat cross section, the pointer being carried by bearings supported by the two springs with the flat section of the springs arranged transversely to the axis of the instrument.

5. A pointer bearing for electro-magnetic measuring instruments in which the pointer carries a coil, comprising an angularly movable pointer mounting, a hollow supporting core piece, a spindle, two pivots, two conical spiral springs of flat cross section, the pivots being fixed on the pointer, and the bearings for the two pivots being at the opposite ends of the spindle, the spindle passing freely through the hollow core piece and connected near its opposite ends to the central portions of the two springs, the outer portions of the springs being supported in recesses formed coaxially at opposite ends of the core.

In witness whereof I affix my signature.

CHARLES EDWIN FOSTER.